United States Patent
Seo

(10) Patent No.: US 7,276,179 B2
(45) Date of Patent: *Oct. 2, 2007

(54) COMPOSITION FOR NON-CHLORIDE BASED AND LESS CORROSIVE LIQUID TYPE DEICER

(75) Inventor: Joung Gu Seo, Seoul (KR)

(73) Assignee: Joyful Future Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/431,989

(22) Filed: May 11, 2006

(65) Prior Publication Data

US 2006/0202157 A1   Sep. 14, 2006

Related U.S. Application Data

(63) Continuation of application No. 11/207,322, filed on Aug. 19, 2005, now Pat. No. 7,063,803.

(30) Foreign Application Priority Data

Aug. 20, 2004 (KR) ............... 10-2004-0065667

(51) Int. Cl.
*C09K 3/18* (2006.01)
*B05D 1/02* (2006.01)
*B05D 5/00* (2006.01)

(52) U.S. Cl. ............. 252/70; 106/13; 427/421.1

(58) Field of Classification Search ............ 252/70; 106/13; 427/421.1

See application file for complete search history.

(56) References Cited

U.S. PATENT DOCUMENTS

| | | | | |
|---|---|---|---|---|
| 6,287,480 | B1 * | 9/2001 | Berglund et al. | 252/70 |
| 6,846,431 | B1 * | 1/2005 | Dunuwila et al. | 252/71 |
| 6,849,198 | B2 * | 2/2005 | Alger | 252/70 |
| 7,063,803 | B2 * | 6/2006 | Seo | 252/70 |

* cited by examiner

*Primary Examiner*—Anthony J. Green
(74) *Attorney, Agent, or Firm*—The Farrell Law Firm

(57) ABSTRACT

A composition for a non-chloride based and less corrosive liquid type deicer is provided. The composition includes: potassium acetate of approximately 10% to approximately 20% by weight; disodium succinate of approximately 3% to approximately 10% by weight; dipotassium succinate of approximately 1% to approximately 5% by weight; ethylene glycol of approximately 5% to approximately 10% by weight; ethanol of approximately 5% to approximately 15% by weight; and an aqueous polyvinyl alcohol solution of approximately 40% to approximately 70% by weight. Such composition of the liquid type deicer is environmentally friendly by not containing chloride ions (e.g., non-pollution in soils), and is cost-effective due to an elongated reaction time by remaining continuously on snow/ice surfaces. Also, the composition of the liquid type deicer can be conveniently storable and easily sprayed, is not being re-frozen while being capable of removing snow/ice, and can replace expensive imported deicers.

9 Claims, No Drawings

COMPOSITION FOR NON-CHLORIDE BASED AND LESS CORROSIVE LIQUID TYPE DEICER

PRIORITY

This application is a Continuation of U.S. application Ser. No. 11/207,322, filed on Aug. 19, 2005, and issued as U.S. Pat. No. 7,063,803, on Jun. 20, 2006, which claims priority under 35 U.S.C. § 119 to an application entitled "Composition for Non-Chloride Based and Less Corrosive Liquid Type Deicer" filed in the Korean Intellectual Property Office on Aug. 20, 2004 and assigned Ser. No. 2004-65667. the contents of both of which are incorporated herein by reference.

BACKGROUND OF THE INVENTION

1. Field of the Invention

The present invention relates to a composition for a non-chloride based and less corrosive liquid type deicer, and more particularly, to a non-chloride based and less corrosive liquid type deicer capable of replacing solid type deicers such as calcium chloride and sodium chloride and capable of reducing corrosiveness and environmental problems.

2. Description of the Related Art

As for deicers and deicing methods that have been currently used, in United States, a mixture of sodium chloride (NaCl) and crushed sands is used at a temperature range from above zero to five degrees Celsius below zero. If the temperature is below negative five degrees Celsius, an amount of NaCl is reduced or calcium chloride ($CaCl_2$) mixed with crushed sands is used. In Canada, deicing salts are mainly used, and sands are used if necessary. For instance, sands are used in the case of iced roads.

In Switzerland, a mixture of salt and salt solution is mainly sprayed over surfaces and, sands are used for sidewalks in mountain areas and urban areas. For those roads requiring a high quality of deicing services, a deicing agent is precendently sprayed over the roads. Especially, an automatic deicing agent spraying system has been implemented as an exemplary model.

The Japanese government has made a special law for securing safe road traffic in frequent snowing/cold regions and, has applied this special law to those designated target roads. In particular, various new technologies such as a system for melting snow/ice using a slush removal apparatus or wind power and a high temperature water spray snow/ice melting facility using wasted heat have been developed.

In South Korea, those chloride-based solid type deicers have been used. Examples of such chloride-based solid type deicers are $CaCl_2$ and NaCl. However, due to strong toxicity of chlorine, various facilities, structures as well as vehicles are corroded, and those melting solutions cause severe environmental destructions, for instance, pollution in rivers, sewages and soils. In addition to the above-mentioned disadvantages of the solid type deicers, a post-cleaning operation is necessary because of excessively used deicers and sands, which are used simultaneously, and thus, deicing costs have been increased.

In more detail, chloride ions contained in the deicing chemical of $CaCl_2$ or NaCl react with iron (Fe), and ferrous chloride ($FeCl_2$) is abruptly produced. However, $FeCl_2$ causes severe corrosion in vehicles, steel reinforcements and steel-framed structures. Also, dissolved $CaCl_2$ becomes a main cause of environmental pollutions in biological organisms around the roads, sewages, water, and roadside trees caused by acidified roads and soils as the dissolved $CaCl_2$ gets into soils and rivers. These environmental-destruction related costs cannot be even estimated.

In consideration of the above-described disadvantages of using the conventional deicers, there have been developed many substitutionary deicers. For instance, urea, calcium magnesium acetates (CMAs), calcium magnesium salt of organic acids (CMOs), less corrosive deicing agents have been proposed. However, these substitutionary deicers have not been commonly used due to lack of effectiveness on costs and intended functions.

SUMMARY OF THE INVENTION

Accordingly, the present invention is directed to a composition for a non-chloride based and less corrosive liquid type deicer that substantially obviates one or more problems due to limitations and disadvantages of the related art.

An object of the present invention is to provide a composition for a liquid type deicer which has characteristics of non-corrosiveness, environmentally friendliness, convenience in storage and cost-effectiveness due to a continuous reaction time and capabilities in removing snow/ice and preventing a re-refreezing tendency and replaces expensive imported deicers.

In more detail, according to one embodiment of the present invention, the liquid type deicer is not corrosive due to a non-chloride based composition, does not pollute soils, and is not re-frozen. Also, the liquid type deicer can be stored is liquid state, is cost-effective due to a continuously maintained reaction as the deicer chemicals remain continuously on snow/ice, and can be easily sprayed. Further, the liquid type deicer is capable of removing snow/ice and preventing a re-freezing tendency and can replace expensive imported deicers.

Another object of the present invention is to provide a composition for a liquid type deicer including potassium acetate, disodium succinate, dipotassium succinate, ethlylene glycol, aqueous polyvinyl alcohol (PVA) solution, and ethanol.

In more detail, according to one embodiment of the present invention, a composition for a liquid type deicer provided with specific characteristics includes potassium acetate of approximately 10% to approximately 20% by weight, disodium succinate of approximately 3% to approximately 10% by weight, dipotassium succinate of approximately 1% to approximately 5% by weight, ethlylene glycol of approximately 5% to approximately 10% by weight, an aqueous PVA solution of approximately 40% to approximately 70% by weight, and ethanol of approximately 5% to approximately 15%.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a composition for a non-chloride based and less corrosive liquid type deicer. Among the provided composition, potassium acetate lowers a freezing point and acts as a snow/ice melting agent. An amount of the potassium acetate is in a range of approximately 10% to approximately 20% by weight, preferably, approximately 10% to approximately 15% by weight. If the potassium acetate among the whole composition has an amount less than approximately 10% by weight, the potassium acetate is less efficient as the snow/ice melting agent. On the other hand, if the potassium acetate has the amount above approximately 20% by weight, a strong base characteristic appears, thereby eluting polyvinyl alcohol.

Among the provided composition, disodium succinate serves as an anti-corrosion agent and has an amount ranging from approximately 3% to approximately 10% by weight, preferably, from approximately 5% to approximately 8% by weight. If the amount of disodium succinate is less than approximately 3% by weight, the disodium succinate does not provide an intended anti-corrosive characteristic. In contrast, if the amount of disodium succinate is greater than approximately 10% by weight, the disodium succinate may impede a descending of a freezing point. Typically, disodium succinate can be produced by using sodium hydroxide and succinic acid.

Dipotassium succinate is a catalytic snow/ice melting agent and has an amount ranging from approximately 1% to approximately 5% by weight, preferably from approximately 2% to approximately 4% by weight. If the amount of dipotassium succinate is less than approximately 1% by weight, a catalytic reaction for melting snow/ice may barely appear. If the amount of dipotassium succinate is greater than approximately 5% by weight, acidity increases, provoking a corrosive characteristic. Commonly, dipotassium succinate can be produced by using potassium hydroxide and succinic acid.

Ethylene glycol serves a role in lowering a freezing point and, among the whole composition, has an amount of approximately 5% to approximately 10% by weight. A preferable amount of ethylene glycol is in a range of approximately 6% to approximately 9% by weight. If the amount of ethylene glycol is less than approximately 5% by weight, the ethylene glycol cannot contribute to the descending of the freezing point. On the other hand, if the amount of ethylene glycol exceeds approximately 10% by weight, the ethylene glycol may impede the melting of snow/ice.

Polyvinyl alcohol (PVA) acts as a binder and is used in an aqueous state. A dilution concentration of PVA ranges from approximately 0.01% weight-weight percentage (w/w) to approximately 0.03% w/w. Especially, an aqueous PVA solution that is diluted with water is commonly used. If the aqueous PVA solution has a concentration less than approximately 0.01% w/w, the aqueous PVA solution provides a weak binding force between chemicals of the composition. If the aqueous PVA solution is diluted above approximately 0.03% w/w, there may be produced precipitations. Among the whole composition, the aqueous PVA solution has an amount ranging from approximately 40% to approximately 70% by weight, preferably from approximately 50% to approximately 60% by weight. If the amount of aqueous PVA solution is less than approximately 40% by weight, amounts of other composing chemicals need to be increased relatively. Hence, there may be a limitation in obtaining a non-freezing characteristic at extremely low temperature or a disadvantage of reducing cost-effectiveness. If the amount of aqueous PVA solution is greater than approximately 70% by weight, an intended melting effect may be reduced.

Ethanol lowers a freezing point and serves as a snow/ice melting agent. Of the whole composition, an amount of ethanol ranges from approximately 5% to approximately 15% by weight, preferably, from approximately 5% to approximately 9% by weight. If the amount of ethanol is less than approximately 5% by weight, the descending of the freezing point and the snow/ice melting effect may be diminished. In contrast, if the amount of ethanol is greater than approximately 15% by weight, there may be a disadvantage of impairing disodium succinate from functioning as an anti-corrosive agent.

Although a manufacturing procedure of such liquid type deicer based on the above described composition is not specifically limited, PVA is first dissolved in a large quantity of water, thereby obtaining a certain concentration of aqueous PVA solution. The aqueous PVA solution is placed into an agitator and, while being agitated, potassium acetate is added and agitated together. Disodium succinate is then added thereto and is agitated again. Afterwards, dipotassium succinate is added to the above resulting composition and then agitated again. Lastly, ethylene glycol is added and agitated and, ethanol is added thereto and agitated thereafter. Through these sequential operations, a composition for a non-chloride based and less corrosive liquid type deicer can be produced. Each composing chemical is agitated at a rate of approximately 1,000 rpm to approximately 1,500 rpm and at a temperature ranging from approximately 10° C. to approximately 30° C.

A composition for a non-chloride based and less corrosive liquid type deicer manufactured according to one embodiment of the present invention has a freezing point of approximately −15° C. to approximately −30° C. Even though lots of moisture is produced on road surfaces as snow/ice melts by the above introduced deicer, there may not be an incidence of re-freezing even at the abrupt descending temperature.

As for one embodied method of removing snow/ice using the aforementioned composition, a pump is inserted into a container placed into a certain vehicle and sprays the above-described deicer through a nozzle. Depending on amounts of received snow, an amount of the deicer sprayed per unit time under various ranges of pressure and a spraying rate are adjusted.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying drawings. It should be also noted that the sprit and scope of the present invention is not limited by certain embodiments of the present invention. Wherever possible, the same reference numbers will be used throughout the drawings to refer to the same or like parts.

Exemplary Embodiment 1

Approximately 55 g of aqueous PVA solution with approximately 0.01% w/w was placed into an agitator and was then agitated. Approximately 19 g of potassium acetate was added thereto and was agitated together. Next, approximately 5 g of disodium succinate was added and was then agitated, being followed by an addition of approximately 2 g of dipotassium succinate. The resulting composition was agitated again. Approximately 10 g of ethylene glycol was added and agitated and afterwards, approximately 9 g of ethanol was added and agitated together. These sequential addition and agitation procedures provide a composition for a liquid type deicer, which dose not contain chloride ions and is less corrosive.

Exemplary Embodiments 2 and 3 & Comparative Examples 1 and 2

Other various exemplary compositions for a liquid type deicer are possible according to other specific embodiments. Table 1 provided below shows detailed description of amounts of composing chemicals of such liquid type deicer which is manufactured by the above described method in the first exemplary embodiment.

TABLE 1

(Unit: grams (g))

| | Embodiment 2 | Embodiment 3 | Comparison 1 | Comparison 2 |
|---|---|---|---|---|
| Aqueous PVA Solution | 50 | 55 | 60 | 70 |
| Potassium Acetate | 15 | 15 | 10 | 10 |
| Disodium Succinate | 5 | 5 | 0 | 5 |
| Dipotassium Succinate | 5 | 5 | 5 | 5 |
| Ethylene Glycol | 10 | 10 | 20 | 10 |
| Ethanol | 15 | 10 | 5 | 0 |

Aqueous PVA solution:
Embodiment 2–0.01% w/w aqueous solution
Embodiment 3–0.01% w/w aqueous solution
Comparison 1–0.01% w/w aqueous solution
Comparison 2–0.01% w/w aqueous solution

Exemplary Experiment

Those various compositions for a liquid type deicer obtained from the above first to the third embodiments and the firs to the second comparison examples are compared with calcium chloride ($CaCl_2$) which is a conventional deicer. Evaluation particulars and methods are described in detail hereinafter.

(1) Corrosive Characteristic

Approximately 10 ml of each sample was placed into approximately 50 ml vials and each lid of vials was opened to provide an air-pathway. A usual silvery white clip was placed into each vial such that approximately ⅔ of each clip was merged into the sample and then, it was checked when corrosion occurred at each clip for the corrosion comparison purpose. Herein, a sample of $CaCl_2$ was an aqueous solution of approximately 25% by weight.

(2) Environmental Friendliness

Those samples were set to have approximately 5% by weight and toxicity of these samples was tested on fish. Especially, longevity values of healthy loaches when using the conventional $CaCl_2$ deicer and the deicers introduced by the above described embodiments were measured for the comparison purpose.

(3) Cost-Effectiveness

A reagent was estimated in the unit of kilograms (Kg) for the individual composition ratio of each sample, and the estimation results were compared with the conventional $CaCl_2$ solution.

(4) Reaction Time (Snow/Ice Removing Effect)

Approximately 50 ml of each sample was placed into individual beakers of approximately 100 ml and then, approximately 9 ml of ice was put thereinto and a time taken for the complete melting of ice was measured. Approximately 25 g of solid $CaCl_2$ was used.

The above described test results are summarized in Table 2 below.

TABLE 2

| | Embodiment | | | Comparison Example | | Calcium Chloride |
|---|---|---|---|---|---|---|
| | 1 | 2 | 3 | 1 | 2 | |
| Phase | Liquid | Liquid | Liquid | Liquid | Liquid | solid |
| Corrosiveness | 65 days | 55 days | 55 days | 30 days | 60 days | 2 days |
| Environmental Friendliness | 10 days | 8 days | 9 days | 7 days | 10 days | 1 day |
| Cost-Effectiveness | 450 Wons/Kg | 450 Wons/Kg | 450 Wons/Kg | 400 Wons/Kg | 300 Wons/Kg | 400 Wons/Kg |
| Reaction Time (Snow/Ice Removing Effect) | About 3 minutes | About 3 minutes | About 3 minutes | About 4 minutes 15 seconds | About 4 minutes | About 5 minutes |

In accordance with certain embodiments of the present invention, there are provided effects as follows. First, the conventionally used calcium chloride deicer, which may corrode rapidly irons, concretes and asphalted pavements and thus, shortening lifetimes of vehicles, bridges and roadways. Compared with the conventional calcium chloride, the introduced liquid type deicer does not include chloride families and thus, an incidence of corrosion is less likely to occur, thereby increasing lifetimes of vehicles and roadways.

Second, calcium chloride is dissolved in water and gets into rivers and soils, causing serious environmental problems including acidification of soils and water pollution, which may eventually result in deaths of plants such as trees in roadsides and various vegetables, and many skin diseases and itchiness of various animals. In contrast, the introduced liquid type deicer is environmentally friendly by not containing chloride ions and as a result, the introduced liquid type deicer does not destruct ecological systems, corrode concrete structures and pollute soils and rivers.

Third, when using the conventional calcium chloride to remove snow/ice, lots of moisture are produced as snow/ice melts and, when the temperature drops down in a certain extent, more wide regions are likely to be frozen again, thereby resulting in a high risk of secondary traffic accidents. However, the introduced liquid type deicer according to certain embodiments of the present invention is capable of melting snow/ice for a long time as simultaneous as of preventing an incidence of re-freezing, which results in a decreased amount of moisture, which may be a potential re-freezing source. Therefore, it is possible to reduce a risk of dangerous secondary traffic accidents.

Fourth, the conventional deicers such as calcium chloride may be hardened into lumps as absorbing moisture from the air when being exposed for a long time. Thus, these lumped deicers need to be crushed again when being used to remove snow/ice. In contrast, the introduced liquid type deicer can be conveniently storable and easily sprayed over surfaces.

Fifth, the conventional calcium chloride may be effective for a short period, and although the conventionally used calcium chloride and sodium chloride is cheap, sands have to be used additionally. Also, the use of these conventional deicers may be expensive requiring an additional cleansing operation and labors therefor. The conventional deicers may have indirect costs related to various environmental problems provoked when using these conventional deicers. However, the introduced liquid type deicer continuously maintains the intended deicing function by remaining on surfaces of snow/ice. As a result, the price of the introduced liquid deicer is not expensive and does not require the additional costs and indirect costs related to environmental problems. That is, the introduced deicer is more cost-effective.

Sixth, since the introduced deicer is in liquid state, it is easy to spray while proving those functions of removing snow/ice and preventing an incidence of re-freezing.

Lastly, based on the above-described effects, the introduced liquid type deicer can also replace expensive imported deicers.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A composition for a non-chloride based and less corrosive liquid type deicer, comprising:
    potassium acetate of approximately 10% to approximately 15% by weight;
    disodium succinate of approximately 5% to approximately 8% by weight;
    dipotassium succinate of approximately 2% to approximately 4% by weight;
    ethylene glycol of approximately 6% to approximately 9% by weight;
    ethanol of approximately 5% to approximately 9% by weight; and
    an aqueous polyvinyl alcohol solution of approximately 50% to approximately 60% by weight.

2. The composition of claim 1, wherein the aqueous polyvinyl alcohol solution has a concentration of approximately 0.01% weight-weight percentage (w/w) to approximately 0.03% w/w.

3. The composition of claim 1, wherein the composition has a freezing point ranging from approximately $-15°$ C. to approximately $-30°$ C.

4. A method for removing snow and/or ice comprising;
    spraying onto a surface containing snow and/or ice a composition comprising
    potassium acetate of approximately 10% to approximately 20% by weight;
    disodium succinate of approximately 3% to approximately 10% by weight;
    dipotassium succinate of approximately 1% to approximately 5% by weight;
    ethylene glycol of approximately 5% to approximately 10% by weight;
    ethanol of approximately 5% to approximately 15% by weight; and
    an aqueous polyvinyl alcohol solution of approximately 50% to approximately 60% by weight.

5. The method for removing snow and/or ice of claim 4 wherein the aqueous polyvinyl alcohol solution has a concentration of approximately 0.01% weight-weight percentage (w/w) to approximately 0.03% (w/w).

6. The method for removing snow and/or ice of claim 4, wherein the composition has a freezing point ranging from approximately $-15°$ C. to approximately $-30°$ C.

7. The method for removing snow and/or ice of claim 4, wherein the composition comprises:
    potassium acetate of approximately 10% to approximately 15% by weight;
    disodium succinate of approximately 5% to approximately 8% by weight;
    dipotassium succinate of approximately 2% to approximately 4% by weight;
    ethylene glycol of approximately 6% to approximately 9% by weight;
    ethanol of approximately 5% to approximately 9% by weight; and
    an aqueous polyvinyl alcohol solution of approximately 50% to approximately 60% by weight.

8. The method for removing snow and/or ice of claim 7 wherein the aqueous polyvinyl alcohol solution has a concentration of approximately 0.01% weight-weight percentage (w/w) to approximately 0.03% (w/w).

9. The method of claim 7, wherein the composition has a freezing point ranging from approximately $-15°$ C. to approximately $-30°$ C.

* * * * *